Sept. 14, 1965 G. W. HARTZELL 3,205,659
HYDRAULIC TRANSMISSION SYSTEM
Filed Dec. 9, 1963
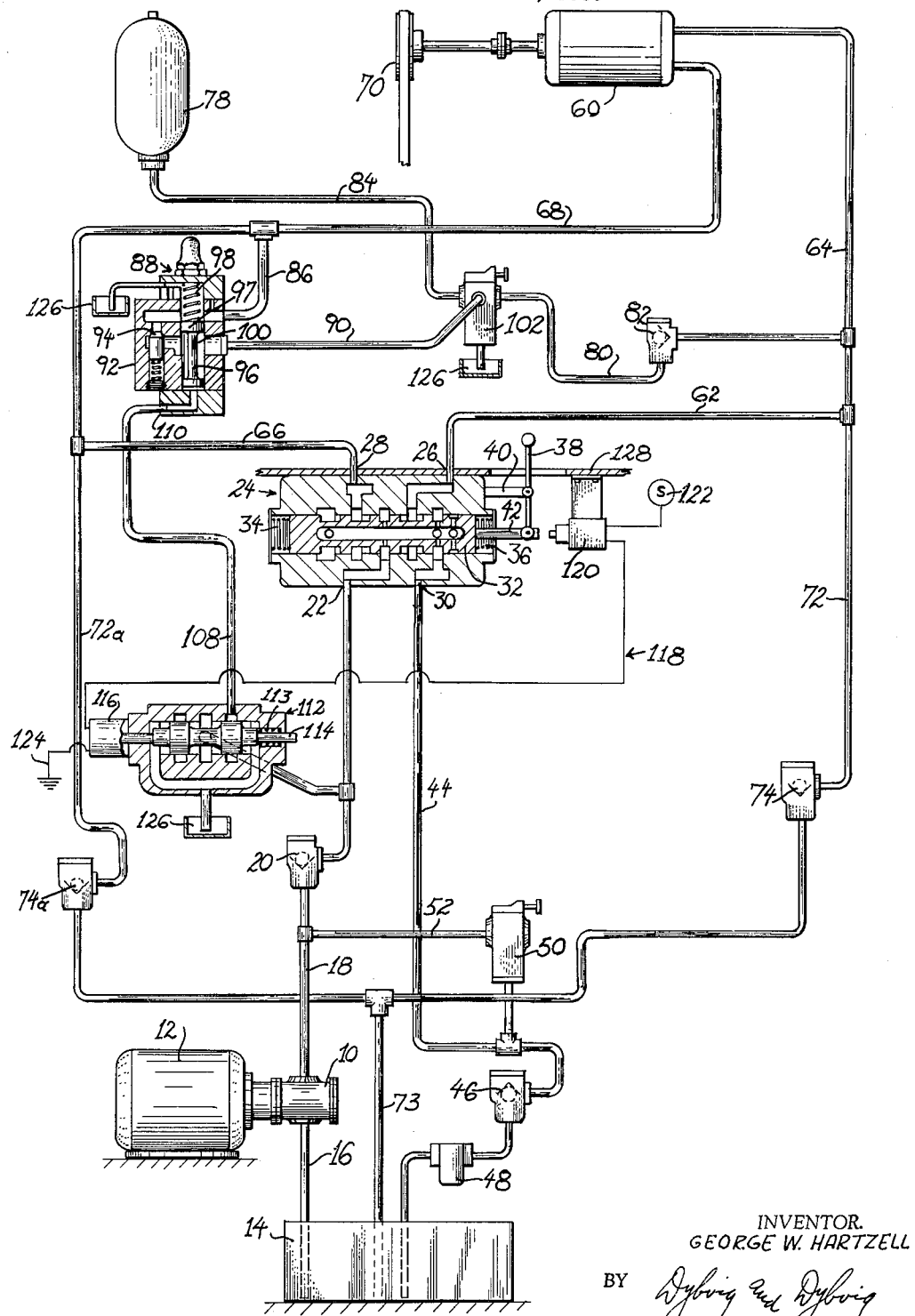
INVENTOR.
GEORGE W. HARTZELL
BY *Dybvig and Dybvig*
HIS ATTORNEYS United States Patent Office 3,205,659
Patented Sept. 14, 1965

3,205,659
HYDRAULIC TRANSMISSION SYSTEM
George W. Hartzell, Piqua, Ohio, assignor to Hartzell Industries, Inc., Piqua, Ohio, a corporation of Delaware
Filed Dec. 9, 1963, Ser. No. 329,092
9 Claims. (Cl. 60—51)

This invention relates to a hydraulic transmission system and more particularly to a system for driving a sawmill feed works. However, as will become apparent, the transmission system may be used in driving a variety of loads.

An object of this invention is the provision of an improved hydraulic transmission system adapted to drive a load in opposed directions.

A further object of this invention is to reduce excessive pressures that may be created in a hydraulic transmission system.

Still another object is to provide a hydraulic transmission system in which excessive pressure created during portions of the cycle of operation are utilized during another portion of the cycle of operation.

Other objects and advantages reside in the construction of parts, the combination thereof, the method of manufacture and the mode of operation, as will become more apparent from the following description.

The single figure of the drawing is a diagrammatic illustration of a hydraulic transmission circuit and an electric circuit connecting portions of the hydraulic circuit.

Referring to the drawing, a hydraulic transmission circuit is illustrated including a constant displacement pump 10 which may be driven by a suitable motive force, such as an electric motor 12, to draw fluid from a tank 14 through a suction conduit 16. The fluid is delivered through a pressure conduit 18 having a check valve 20 therein to the inlet port 22 of a three-position, four-way valve, generally designated 24. The valve 24 may be entirely conventional, having, in addition to the inlet port 22, three discharge ports 26, 28 and 30, and a slidable valve spool 32 normally biased to a central or "neutral" position by means of springs 34 and 36 at the extreme ends of the spool. A shifting lever 38 mounted intermediate its ends to a support rod 40 is connected at one end to a spool actuator rod 42 such that the spool 32, when shifted, selectively blocks fluid communication between the port 22 and the ports 26, 28 and 30. Also, by gradual shifting of the spool 32, the selective blocking referred to may take place gradually so that a throttling action is achieved. In the neutral position, the two discharge ports 26 and 28 are blocked, but fluid may pass from the inlet port 22 to the discharge port 30 and back to the tank 14 through a return conduit 44, a check valve 46 and a filter 48. To relieve excess pressure in the conduit 18 upon operation of the valve 24, a relief valve 50 is connected between the conduits 18 and 44 by a relief conduit 52.

One side of a reversible, constant displacement fluid motor 60 is connected to the valve discharge port 26 through a first valve conduit 62 and a first motor conduit 64. The other side of the motor 60 is connected to the discharge port 28 through a second valve conduit 66 and a second motor conduit 68. When the valve spool 32 is shifted to the left, as viewed in the drawing, fluid under pressure is supplied from the conduit 18 through the conduits 62 and 64 to drive the motor 60, the fluid returning through the conduits 68, 66, the ports 28 and 30 to the return conduit 44 and ultimately to the tank 14. The motor 60 is thereby caused to rotate in a first direction, which, for convenience, will be referred to as "forward." When the spool 32 is shifted to the right as viewed in the drawing, the motor 60 is driven in the opposite direction, or "reverse." When in reverse, the fluid under pressure passes from the conduit 18 through the conduits 66 and 68 to the motor 60 and returns through the conduits 64, 62 and 44 to the tank 14.

The hydraulic transmission circuit thus far described is conventional. The motor 60 is designed to deliver a rotary output driving a load schematically illustrated in the form of a pulley mechanism 70. A contemplated application of the circuitry described herein is for use with a sawmill feed works, the load being driven by the motor 60 constituting a carriage (not shown) supporting a log, the carriage being driven in a forward direction under controlled speeds past a saw blade (not shown) to cut the log as desired. The carriage is then returned and the position of the log shifted for another cut by the saw blade. In operation, assuming that the log has just been mounted on the carriage, the operator in control of the lever 38 would shift the valve spool 32 to the left causing fluid under pressure to be supplied to the motor 60 through the conduit 64 to drive the carriage in the forward direction whereupon the log is driven past the saw blade. When the operator observes that the carriage is nearing the end of its forward travel, the valve spool 32 is moved through its central position to the right, whereupon fluid under pressure is supplied to the motor 60 through the conduit 68. The momentum of the sawmill carriage and the log thereon is such that the motor 60 will continue to be driven by the load in a forward direction and the initial connection of the pressure conduit 18 to the conduits 66 and 68 will serve to brake the forward momentum of the carriage. After a short interval, the forward momentum of the carriage will be fully braked and the fluid under pressure in the conduit 68 will serve to drive the motor 60 in reverse. Thereupon, the carriage is returned to its initial position. As the carriage approaches the end of its reverse travel, the operator moves the shifting lever 38 to change the position of the spool 32 and, again, the initial supply of the fluid pressure to the motor 60 will serve to brake momentum of the carriage.

Because the motor 60 temporarily continues to rotate in a forward direction as the valve spool 32 is shifted to block the flow of fluid under pressure from the conduit 18 to the conduits 62 and 64, the motor 60 may be said to function temporarily as a pump and will tend to draw fluid from the conduit 64. To avoid having the motor cavitate under such circumstances, a conduit 72 having a check valve 74 therein is connected between a suction conduit 73 submerged in the tank 14 and the conduit 64. As apparent, the conduits 72 and 73 serve to supply fluid from the tank 14 to the motor 60 during the short interval of time in which it is acting as a pump. Similarly, a conduit 72a having a check valve 74a therein is connected between the suction conduit 73 and the conduit 68 whereupon fluid maybe pumped from the tank 14 by the motor 60 when it acts as a pump at the end of the reverse travel of the carriage.

Those skilled in the art will appreciate that considerable pressures are created in the conduits 62, 64, 66 and 68 at those times when the operator shifts the lever 38 to reverse the direction of motor drive. Aside from the normal operating pressure supplied by the pump 10, considerable additional pressure is created because of the pumping action of the motor 60 described above, which is in opposition to the output of the pump 10. In accordance with this invention, high pressures in the transmission circuit are relieved by a circuit employing a fluid pressure accumulator 78 placed across the conduits 64 and 68. The accumulator illustrated is of the type wherein the hydraulic fluid is permitted to flow into a closed gas chamber filled with an inert gas and in so doing is required to compress the gas in the chamber, thereby storing energy in the compressed gas. It will be recognized by those skilled in the art that other types of accumulators such as those involving a piston which compresses a spring can be substituted for the one illustrated without departing from the scope of the present invention.

Excess fluid pressure in the conduit 64 is relieved by a flow of fluid to the accumulator 78 through a conduit 80 having a check valve 82 therein and a conduit 84. On the other hand, the conduit 68 is connected to the accumulator 78 by a conduit 86 and a flow control assembly, generally designated 88, which, in turn, is connected to the conduit 84 by a conduit 90.

The flow control assembly 88 includes a body member 92 having a check valve section 94 and a check valve by-pass section including a cavity 100 and a pressure responsive by-pass valve spool 96 biased downwardly in said cavity as by a spring 98 so as to block communication between the conduit 86 and the conduit 90. The valve spool 96 is normally held at its lowermost position in the body member 92 by the spring 98 such that the upper spool portion 97 of the valve spool 96 separates the conduit 86 from the conduit 90. Excessive pressure in the conduit 68 is relieved by fluid passing through the conduit 86, the check valve section 94 and the conduit 90 to the accumulator 78. To protect the relief circuit from extraordinarily high pressures, a relief valve 102 is positioned at the junction of the conduits 80, 84 and 90.

Thus, it is seen that, during intervals of high pressure in either line 64 or line 68, the pressure is relieved by the accumulator 78. Because of the check valve 82 and the check valve section 94, fluid under pressure contained in the accumulator 78 is not introduced back into the system except, as will be described below, during an advantageous time in the cycle of operation of the circuit.

To release the pressure in the accumulator 78, the cavity 100 is opened by movement of the by-pass spool 96 against the spring bias 98. Such movement of the spool 96 is caused by introduction of fluid under pressure from the conduit 18 through a conduit 108 connected between the conduit 18 and a presure control port 110 at the base of the flow control assembly 88. Normally, flow of fluid from the conduit 18 through the conduit 108 is obstructed by a trigger valve 112 having a shiftable spool 114 controlled by a spring 113 subject to override by a solenoid spool actuator 116. The spool actuator 116 is adapted, when energized, to shift the spool 114 against the bias of the spring 113 to open the conduit 108. Energization of the solenoid actuator 116 is controlled by electric circuit means, generally designated 118, connecting a limit switch 120 to the solenoid 116 in series relation between a source 122 and a ground connection 124. The limit switch 120 is positioned for engagement and actuation by the spool actuator rod 42 when the valve 24 is in its "full reverse" condition. That is, the limit switch 120 is actuated when the spool 32 has been shifted to the extreme right, as viewed in the drawing, so as to supply fluid under pressure from the conduit 18 to the conduit 66.

Assuming the hydraulic circuit is used as a transmission circuit for driving a sawmill feed works, the cycle of operation is as follows. Manual actuation of the shifting lever 38 causing the valve spool 32 to move to the left supplies fluid under pressure through the conduit 64 to drive the motor 60, and consequently the carriage, in a forward direction. When fluid under pressure is first introduced to the motor 60 with the carriage at rest, the inertia of the carriage will induce a pressure surge in the conduit 64 and a certain amount of fluid may enter through the check valve 82 into the accumulator 78. Once the inertia of the motor 60 and the carriage has been overcome, fluid will pass through the conduit 64, the motor 60, the conduit 68, the valve 24 and the return conduit 44 to the tank 14. As the operator observes the carriage nearing the end of its forward travel, the lever 38 will be shifted gradually from the forward position through the neutral position and partially into the reverse position. As already noted, there will be a considerable pressure increase in the conduit 68, which will be partially absorbed by fluid flowing through the check valve section 94 to the accumulator 78. After the forward travel of the carriage has been fully braked and the operator observes that the carriage has begun its return movement, the shifting lever 38 is moved to the full reverse position. As the full reverse position of the lever 38 is reached, the switch 120 is actuated whereupon the solenoid 116 is energized to open the trigger valve 112. Accordingly, a small amount of fluid will flow from the conduit 18 through the conduit 108 to the pressure control port 110, causing the cavity 100 to be opened. The fluid under pressure in the accumulator 78 will thereby be dumped into the conduit 68 through conduit 86, the accumulator 78 effectively serving as an additional pump to drive the motor 60 at an increased speed during its reverse travel. When the operator subsequently observes that the carriage is approaching the end of its reverse travel, the shifting lever 38 is then gradually moved from the full reverse through the neutral to the forward position. As the shifting lever leaves the full reverse position, the switch 120 is released deenergizing the solenoid 116 and permitting the spring 113 to return the spool 114 to the left, as viewed in the figure. This enables the spring 98 to return the spool 96 so as to close the cavity 100. As the shifting bar 38 moves to the forward position, the reverse movement of the carriage is again braked and any excess pressure in the conduit 64 is absorbed by the accumulator 78. Subsequently, the carriage will begin to repeat its forward movement and the entire cycle described above will be repeated.

Because of the aforedescribed hydraulic relief circuitry, there are no sudden shocks to the main transmission system occurring during the change in direction of the hydraulic motor output. During the forward movement of the carriage in the sawmill feed works, the carriage is desirably driven at a constant, controlled rate of travel because a sudden surge of carriage speed could adversely affect the sawing operation. In accordance with this invention, the accumulator pressure is released during the reverse drive of the motor 60 when constant, controlled speed is not necessary. This release of accumulated pressure constitutes a return to the system of energy associated with the driven load which has been conserved in stopping the driven load to reverse its position.

The various circuit elements, such as the pump 10, the fluid motor 60, the accumulator 78 and the several valves are intended to be entirely conventional and, hence, are not described or illustrated in greater detail herein. Drains 126 are shown in connection with the valves 102, 88 and 112. As usual, similar drains could be associated with the valve 24 and the motor 60. The manner in which the various elements are supported, of course, is dependent upon the requirements of the structure with which the circuitry is associated. Aside from the mounting of the limit switch 120 adjacent the valve 24, which elements are illustrated as mounted on a common support plate 128, the various circuit elements may be mounted in any desired relationship.

Although the invention has been described in connection with a sawmill feed works, the same transmission circuit may be used for driving any desired load.

Although the presently preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In combination: a source of fluid under pressure; a fluid motor adapted to rotate in a forward and a reverse direction and drivingly connected to a load; hydraulic transmission circuit means connecting said motor to said source including a manually operable valve having at least two positions, a first fluid conduit connected between said valve and said motor to drive said motor in said forward direction when said valve is positioned to connect said first fluid conduit to said source, a second fluid conduit connected between said valve and said motor to drive said motor in said reverse direction when said valve is positioned to connect said second fluid conduit to said source, said valve means connecting one of said conduits to a reservoir when the other of said conduits is connected to said source and connecting the other of said conduits to the reservoir when said one of said conduits is connected to said source; and pressure relief circuit means connected between said first conduit and said second conduit preventing excessive pressure in said transmission circuit means, said relief circuit means including an accumulator, conduit means connecting said accumulator to said first and second conduits, check valve means permitting flow of fluid from said conduits to said accumulator but preventing flow of fluid from said accumulator to said conduits whereby said accumulator receives fluid from said first or second conduits when the fluid pressure in either of said conduits exceeds that already in said accumulator, said accumulator absorbing excess pressure in said conduits, and accumulator discharge means operative to discharge fluid from said accumulator to one of said conduits when fluid passes therethrough to drive said motor, thereby temporarily increasing the work capacity of said motor.

2. The combination of claim 1 wherein said means operative to discharge fluid from said accumulator includes a normally closed pressure responsive valve connected between said accumulator and the conduit to which fluid is discharged, a normally closed trigger valve connected between said source and said pressure responsive valve, and actuator means opening said trigger valve whereupon fluid under pressure is supplied to said pressure responsive valve to open a passageway therein.

3. The combination of claim 2 wherein said actuator means includes a solenoid operated valve actuator operatively connected to said trigger valve, and switch means for energizing said solenoid supported adjacent said manually operable valve, said manually operable valve including a shiftable member actuating said switch means upon movement thereof.

4. The combination of claim 1 wherein said motor is a positive displacement motor operable as a pump upon delivery of mechanical power thereto to rotate the same, and including third conduit means by-passing said manually operable valve to connect said first and second conduit means to said tank for transmission of fluid from said tank to said motor, said third conduit means including check valve means blocking any fluid flow from said motor to said tank through said third conduit means.

5. The combination of claim 4 including drive means connecting said load to said motor for moving said load in opposite directions corresponding to the forward and reverse directions of said motor, said directions being selected by said manually operable valve, said combination being so constructed and arranged that, in reversing the direction of movement of said load, the momentum of said load in the direction being reversed drives said motor as a pump in opposition to said source of fluid under pressure creating a fluid pressure surge which brakes said load in the direction being reversed and which is relieved by said accumulator, said accumulator, upon being discharged to said one conduit by said discharge means, returning to said motor energy previously conserved in braking said load.

6. In a hydraulic motor control circuit including a conduit suplying fluid under pressure to a fluid motor, pressure relief means comprising an accumulator, fluid conduit means connecting said accumulator to said conduit, said fluid conduit means including check valve means permitting fluid to flow from said conduit to said accumulator and blocking flow of fluid from said accumulator to said conduit, a fluid passageway by-passing said check valve means, normally closed valve means blocking flow of fluid through said passageway, and means to open said normally closed valve means thereby permitting fluid to flow from said accumulator through said passageway into said conduit, said means to open said normally closed valve means including a solenoid actuator, a trigger valve connected between said normally closed valve means and a source of fluid under pressure, and a solenoid connected to said solenoid actuator controlling the operation of said normally closed valve means.

7. In a hydraulic motor control circuit including a pair of conduits for supplying fluid under pressure to a fluid motor, valve means selective to supply fluid under pressure to one or the other of said conduits, pressure relief means comprising an accumulator, fluid conduit means connecting said accumulator between said pair of conduits, said fluid conduit means including check valve means permitting fluid to flow from said pair of conduits to said accumulator and blocking flow of fluid from said accumulator to said pair of conduits, a fluid passageway connected to one of said pair of conduits and to said accumulator by-passing said check valve means, a normally closed by-pass valve in said passageway, and means to open said by-pass valve responsive to operation of said first mentioned valve means.

8. In a hydraulic motor control circuit including a pair of conduits for supplying fluid under pressure to a fluid motor, valve means selective to supply fluid under pressure to one or the other of said conduits, pressure relief means comprising an accumulator, fluid conduit means connecting said accumulator between said pair of conduits, said fluid conduit means including check valve means permitting fluid to flow from said pair of conduits to said accumulator and blocking flow of fluid from said accumulator to said pair of conduits, and means responsive to operation of said first mentioned valve means to supply fluid to said one conduit to also discharge said accumulator to said one conduit.

9. In a hydraulic motor control circuit including a pair of conduits for supplying fluid under pressure to a fluid motor, valve means selective to supply fluid under pressure to one or the other of said conduits, pressure relief means comprising an accumulator, fluid conduit means connecting said accumulator to a first of said conduits, said fluid conduit means including check valve means permitting fluid to flow from said first conduit to said accumulator and blocking fluid flow from said accumulator to said first conduit, and means responsive to operation of said first mentioned valve means to supply fluid to said first conduit to also discharge said accumulator to said first conduit.

References Cited by the Examiner

UNITED STATES PATENTS

| 2,282,977 | 5/42 | Mast | 60—52 |
| 2,595,248 | 5/52 | Greer et al. | 60—51 |
| 2,623,358 | 12/52 | Greer | 60—51 |
| 2,802,336 | 8/57 | Ball | 60—51 |

JULIUS E. WEST, *Primary Examiner.*

EDGAR W. GEOGHEGAN, *Examiner.*